United States Patent [19]

Laurita

[11] Patent Number: 4,856,980
[45] Date of Patent: Aug. 15, 1989

[54] INJECTION MOLDING APPARATUS FOR MAKING PARTS HAVING COMPLEX GEOMETRIC SHAPES

[75] Inventor: Joseph N. Laurita, Wayne, N.J.

[73] Assignee: Schmid Laboratories, Inc., Little Falls, N.J.

[21] Appl. No.: 99,147

[22] Filed: Sep. 18, 1987

[51] Int. Cl.$^4$ ............................................. B29C 45/32
[52] U.S. Cl. ...................................... 425/572; 249/59; 249/64; 249/144; 264/69; 264/161; 264/296; 264/297.1; 264/336; 425/577; 425/456; 425/457
[58] Field of Search ............... 425/456, 457, 556, 572, 425/574, 575, 577, 581; 264/69, 71, 72, 161, 296, 297.1, 336; 249/59, 64, 144

[56] References Cited

U.S. PATENT DOCUMENTS

| | | | |
|---|---|---|---|
| 3,064,310 | 11/1962 | Cooprider | 425/577 |
| 4,201,535 | 5/1980 | Ninneman | 425/577 |
| 4,422,995 | 12/1983 | Schad | 425/577 |

OTHER PUBLICATIONS

The American College Dictionary, copyright 1970, Random House, Inc., p. 652.

Primary Examiner—Jay H. Woo
Assistant Examiner—Timothy W. Heitbrink
Attorney, Agent, or Firm—Darby & Darby

[57] ABSTRACT

An apparatus for making parts having complex geometric shapes by injection molding apparatus. The apparatus avoids the formation of a parting line in the molded object. The apparatus includes an injector plate, an ejector plate and a floating plate. The injector plate has at least one mold cavity for making a part and a passageway to allow molten plastic to enter the mold cavity. The ejector plate has at least one mold cavity corresponding to the mold cavity in the injector plate. The floating plate has at least one projection. The plates are adapted to fit together when the mold is closed so that the floating plate is between the injector and ejector plates and the projection fits centrally between the cavities of the injector and ejector plates. A mechanism moves the injector plate, ejector plate and floating plate with respect to one another. Another mechanism provides a motion for forwardly jack-screwing the projection when a molded part is still in a deformable state while restraining the base of the part from movement to substantially remove the parting line from the molded part.

3 Claims, 2 Drawing Sheets

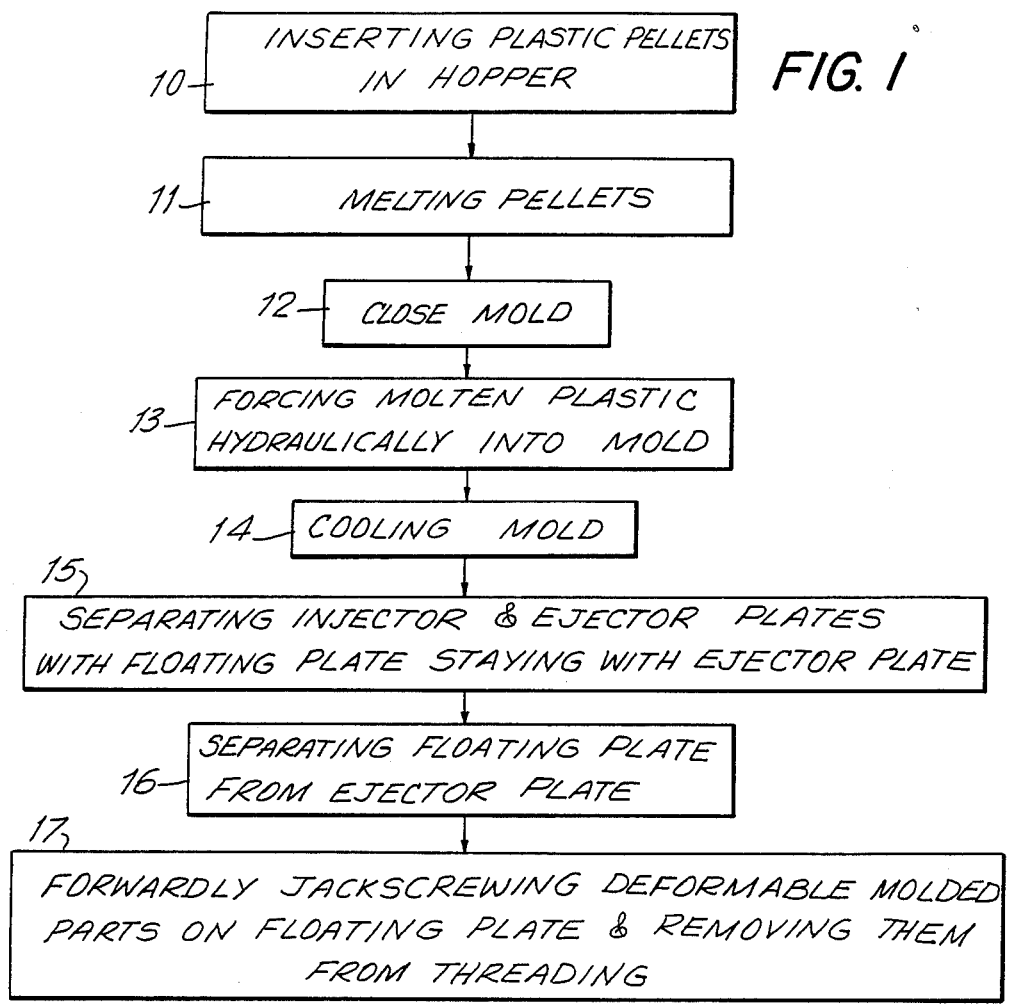
FIG. 1
FIG. 2a FIG. 2b FIG. 2c
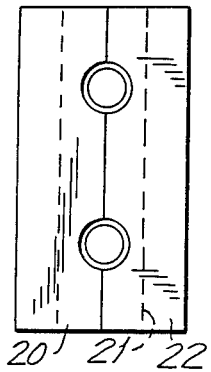  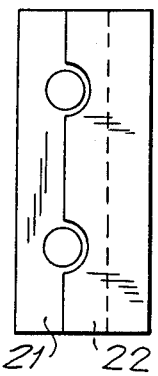  

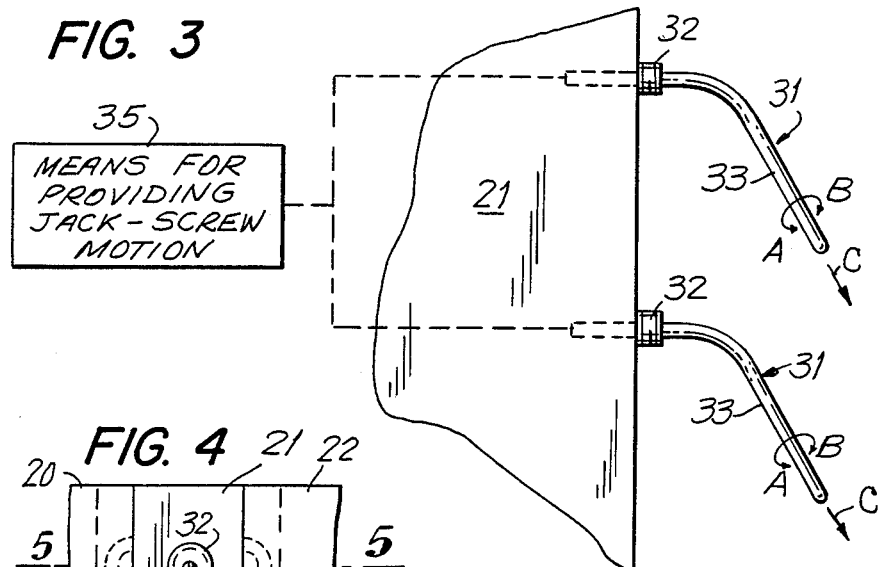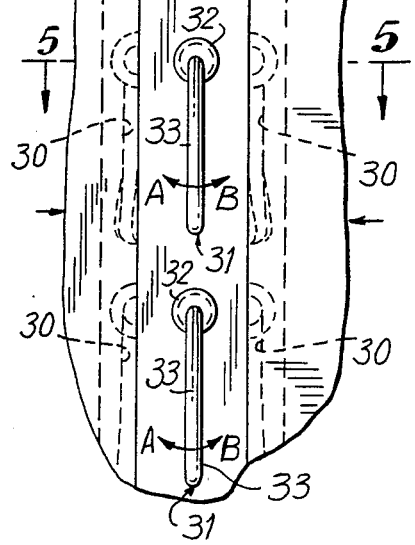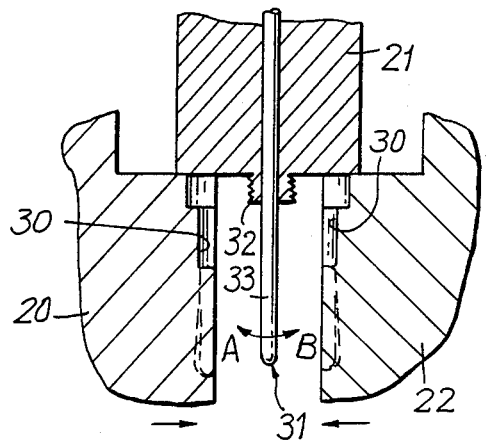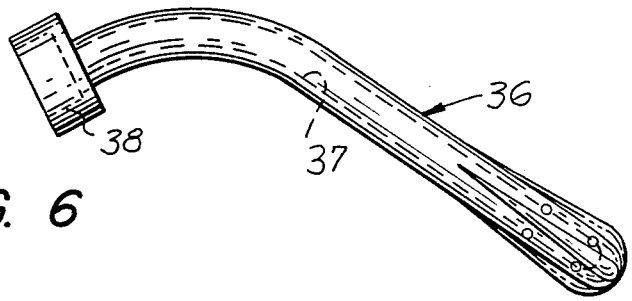

4,856,980

INJECTION MOLDING APPARATUS FOR MAKING PARTS HAVING COMPLEX GEOMETRIC SHAPES

FIELD OF THE PRESENT INVENTION

The present invention relates to injection molding methods and apparatus and, more particularly, to improvements in manufacturing complicated parts by such methods and apparatus.

BACKGROUND OF THE PRIOR ART

Injection molding methods and apparatus have long been known. When parts to be manufactured by such techniques are complicated in shape, it is usually required to employ secondary operations to remove flashing on the molded part to create a smooth surface and avoid a significant parting line.

It is accordingly an object of the present invention to provide a method and apparatus for the manufacture by injection molding of parts which are complicated in shape without the need for secondary handling operations.

It is another object of the present invention to provide a method and apparatus for the manufacture by injection molding of parts which are complicated in shape without a parting line and without the need for secondary operations.

SUMMARY OF THE PRESENT INVENTION

In accordance with one aspect of the invention, a method for making parts having complex geometric shapes by injection molding apparatus having an injector plate, an ejector plate and a floating plate comprising the steps of closing the mold so that the injector plate is on one side, the ejector plate is on the other side, and the floating plate is therebetween. The method also comprises forcing molten plastic into the closed mold, cooling the mold, separating the injector plate from the ejector and floating plates, separating the floating plate from the ejector plate so that the molded but still-deformable part remains seated on a projection attached to the floating plate, and forwardly jack-screwing the projection within the still-deformable part while retaining the base of the part fixed so that the parting line on the part is substantially removed.

Another aspect of the invention is an injection molding apparatus comprising means for supplying molten plastic to a mold, the mold including an injector plate, an ejector plate and a floating plate. The floating plate has at least one mold cavity for making a part and having a passageway to allow the molten plastic to enter the mold cavity. The ejector plate has at least one mold cavity corresponding to the mold cavity in the injector plate. The floating plate has at least one projection. The plates are adapted to fit together when the mold is closed so that the floating plate is between the injector and ejector plates and the projection fits centrally between the cavities of the injector and ejector plates. The cavities are made to oppose each other in the mold. The cavities define the outer surface of a part to be made and the projection defines the inner surface of a part to be made. Means are included for moving the injector plate, ejector plate and floating plate with respect to one another so as to allow the plates to be brought together when the molten plastic is injected in the mold, to be partially separated with the injector plate being apart from the floating and ejector plates during a first cooling period and to allow all three plates to be totally separated during a second cooling period. Finally, included are means for forwardly jackscrewing the projection when the mold and part is still in a deformable state while restraining the base of the part from movement so as to substantially remove the parting line from the molded part.

For a better understanding of the present invention, reference is made to the following description and accompanying drawings, while the scope of the present invention will be pointed out in the appended claims.

BRIEF DESCRIPTION OF THE DRAWINGS

In the drawings:

FIG. 1 illustrates in block form the sequential steps of the method in accordance with the present invention;

FIGS. 2a, 2b and 2c illustrate the successive movements of the injector, ejector and floating plates during successive steps of the present invention;

FIG. 3 is a partial side view of the floating plate of the present invention;

FIG. 4 diagrammatically illustrates a partial front view of the molds as they are coming together at one stage in the inventive process;

FIG. 5 is a section view along the line 5—5 of FIG. 4; and

FIG. 6 illustrates an example of a molded part which may be made according to the inventive method and apparatus.

DESCRIPTION OF THE PREFERRED EMBODIMENTS

The present invention encompasses injection molding methods and apparatus employing a deformable plastic material which is melted, and then finally injected into a mold. When a part to be molded has screw threads and an elongated curvature with an internal recess, a more complicated molding apparatus is required. Such apparatus will require opposing injector and ejector plates and a floating plate. The injector and ejector plates bear the molds or depressions for the outer surface of the part while the floating plate bears the complementary inner shape of the part to be molded.

FIG. 1 illustrates the various steps of the method of the present invention. Initially, plastic pellets are inserted into a hopper, shown as step 10. These pellets (typically high density polyethylene) are then heated, step 11, to a temperature which is sufficient to melt the pellets. An appropriate temperature is from 400° C. to 500° C. The three-part mold is then closed, step 12. Molten plastic is then hydraulically forced into the mold by way of narrow openings in the injector plate, step 13. The mold is then cooled to a predetermined degree (usually 10 to 15 seconds is allowed), step 14. The injector and ejector plates are then separated (with the float plate staying with the ejector plate), step 15. The float plate is then separated from the ejector plate, step 16. At this point, the molded parts are on projections on the float plate, which include a threaded portion at the base (to be described in further detail below). These freshly molded parts are still warm enough to deform. By applying a forward jack-screwing motion to the projections on the floating plate, the part is twisted so as to modify the parting line, step 17. The part is then removed from the mold. This technique produces a molded part having minimum evidence of a parting line and avoids the need for secondary flashing removing operations.

The relative positions of the three plates in various steps of the method are shown schematically in FIGS. 2a, 2b and 2c. In FIG. 2a, the injector plate 20, ejector plate 22 and intermediate or floating plate 21 are shown together as they would be in readiness for injection of molten plastic (steps 12 and 13). After the mold has cooled, the injector plate 20 is separated from the other two plates (step 15), as shown in FIG. 2b. Finally, in FIG. 2c, the floating plate 21 is separated from the ejector plate 22 (steps 16 and 17).

FIGS. 3–5 illustrate the three plates as they are about to come together prior to injection. Injector plate 20 and ejector plate 22 have a plurality of cavities 30 which oppose each other. Each cavity represents one-half of the external surface of a part to be produced. Centrally located with respect to the opposing cavities are solid metallic projections 31 affixed to the floating plate. When the mold is closed, the spacing between the two cavity halves and the outer surface of the projections simultaneously defines the outer and inner surfaces of the part to be molded since the molten plastic fills up all of the space therebetween.

An example of a part which may be molded by the inventive method and apparatus is shown in FIG. 6, which includes an internally threaded base portion 38 and an elongated curved portion 36 having a central internal passageway 37 along its length.

In FIG. 3, the projections 31 on the floating plate are shown in greater detail. Each projection includes a base portion 32 for the provision of the externally threaded portion and an elongated projection 33. As the still-soft, molded part sets on the projection 31, the projection is made to move alternately in directions A and B while simultaneously moving forward in direction C. This erases the parting line. The jack-screwing motion is provided by an appropriate motor drive shown schematically as 35 in FIG. 3.

The molded part is then unscrewed from base 32 and falls off the floating plate.

In the context of the present application, the term "ejector plate" encompasses a complementary plate of the mold from which the molded part is removed as the mold cools; the term "jack-screwing" encompasses a continued side-to-side movement of a part or projection.

While the foregoing description and drawings represent the preferred embodiments of the present invention, it will be obvious to those skilled in the art that various changes and modifications may be made therein without departing from the true spirit and scope of the present invention.

What is claimed is:

1. Injection molding apparatus comprising: means for supplying molten plastic to a mold;
    said mold including:
    (a) an injector plate having at least one mold cavity for making a part and having a passageway to allow molten plastic to enter said mold cavity;
    (b) an ejector plate having at least one mold cavity corresponding to said mold cavity in said injector plate; and
    (c) a floating plate having at least one projection; said plates adapted to fit together when said mold is closed so that said floating plate is between said injector and ejector plates and the projection fits centrally between the cavities of said injector and ejector plates, which cavities are made to oppose each other, said cavities defining the outer surface of a part to be made and said projection defining the inner surface of a part to be made;
    means for moving said injector plate, ejector plate and floating plate with respect to one another so as to allow said plates to be brought together when the molten plastic is injected in the mold, to be partially separated with the injector plate being apart from the floating and ejector plates during a first cooling period and to allow all three plates to be totally separated during a second cooling period; and
    means for forwardly jack-screwing said projection when a molded part is still in a deformable state while restraining the base of the part from movement so as to substantially remove the parting line from the molded part.

2. The apparatus of claim 1, wherein said projection on said floating plate has a threaded base portion, said threaded base portion acting to hold a molded part during a jack-screwing operation.

3. The apparatus of claim 1, wherein said projection has an elongated, arcuate shape.

* * * * *